(12) United States Patent
Baruah et al.

(10) Patent No.: US 12,523,145 B2
(45) Date of Patent: Jan. 13, 2026

(54) CHEMICAL TRACER SPOOL FOR CASING-CASING ANNULUS LEAK SOURCE DETECTION

(71) Applicant: SAUDI ARABIAN OIL COMPANY, Dhahran (SA)

(72) Inventors: Keshabananda Baruah, Abqaiq (SA); Hisham I. Al-Shuwaikhat, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 298 days.

(21) Appl. No.: 18/477,070

(22) Filed: Sep. 28, 2023

(65) Prior Publication Data

US 2025/0109682 A1    Apr. 3, 2025

(51) Int. Cl.
*E21B 47/11*    (2012.01)
*E21B 47/117*   (2012.01)

(52) U.S. Cl.
CPC ............ *E21B 47/11* (2020.05); *E21B 47/117* (2020.05)

(58) Field of Classification Search
CPC ...... E21B 47/11; E21B 47/117; E21B 47/111; E21B 47/10; E21B 49/08; E21B 49/10; G01M 3/225; G01M 3/229; G01M 3/20; G01M 3/207; G01N 7/10
USPC ...................... 73/40, 40.5 R, 170.04, 861.07; 166/250.08, 336–337, 250.12
See application file for complete search history.

(56) References Cited

U.S. PATENT DOCUMENTS

2019/0323342 A1* 10/2019 Pedersen .................. G01M 3/20
2024/0337183 A1* 10/2024 Saini ........................ C09K 8/70

* cited by examiner

*Primary Examiner* — John E Breene
*Assistant Examiner* — Truong D Phan
(74) *Attorney, Agent, or Firm* — Osha Bergman Watanabe & Burton LLP

(57) ABSTRACT

Described is a system for identifying a leak in a casing-casing annulus of a well. The system includes a chemical tracer spool positioned at a casing-casing annulus of a wellbore. The chemical tracer spool includes a porous layer with a polymer media and a chemical tracer molecule embedded in the porous layer. An inner surface of the porous layer defines a flow channel configured to allow fluid flow of a fluid. The chemical tracer molecule has a chemical affinity for oil, gas, or water, and is configured to diffuse into the fluid flow. A collection point is configured to collect a sample of the fluid.

20 Claims, 6 Drawing Sheets

CHEMICAL TRACER SPOOL FOR CASING-CASING ANNULUS LEAK SOURCE DETECTION

BACKGROUND

In oil and gas, an annulus, named after the corresponding geometric concept, is any space between pipes, tubing, or casing and the formation surrounding the annulus. During the drilling process, an annulus allows for fluid to circulate in the well. In a completed well, there may be different annuli. A casing-casing annulus is the space between two casings. A casing-casing annulus does not have any connection to the wellbore fluid. In the majority of cases, casing-casing annuli are filled with cement up to the surface; therefore, no pressure is expected in the annulus. Casing-casing annulus pressure is the result of either flow from a formation in open communication with an annulus (the absence of a barrier) or a barrier failure that creates an unintended flow path. Examples of barrier failures are an uncemented or ineffectively cemented annuli, a tubular connection leak, a packer leak, inadequate hydrostatic pressure, or loss of hydrostatic pressure.

A concern for wells that exhibit sustained annulus pressure is that a down-potential hazard posed by sustained casing pressure may occur depending on the magnitude of the leak rate and the pressure in the annulus. Keeping the annuli pressure within operating limits of the completion is essential if a decision is made to keep producing the well, or until another solution is implemented to eliminate the leak.

The source of annulus pressure may be any pressurized formation, such as a hydrocarbon-bearing formation, a water-bearing formation, a shallow gas zone, a shallow water zone, or pressure from an inner casing and/or tubing string. Various techniques have been applied to identify the leak source, such as a running noise (acoustic) log, a high resolution temperature log, distributed temperature sensing, and effluent sample analysis. However, each technique is limited based on well conditions, leak pressure, leak rate, leak volume, pressure build-up, and bleed off time.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for identifying a leak in a casing-casing annulus of a well. The system comprises a wellbore and a first chemical tracer spool positioned at a first casing-casing annulus of the wellbore. A second chemical tracer spool is positioned at a second casing-casing annulus of the wellbore. The first chemical tracer spool and the second chemical tracer spool each comprise a housing including an inlet end and an outlet end; an inlet coupled to the housing and positioned at the inlet end; an outlet coupled to the housing and positioned at the outlet end; and a porous layer. The porous layer comprises a polymer media and a chemical tracer molecule embedded therein. The porous layer is positioned within the housing between the inlet end and the outlet end. An inner surface of the porous layer defines a flow channel therethrough configured to allow fluid flow. The chemical tracer molecule has a chemical affinity for fluid selected from the group consisting of oil, gas, or water, and is configured to diffuse into the fluid flow. The chemical tracer molecule of the first chemical tracer spool is different than the chemical tracer molecule of the second chemical tracer spool. A collection point downstream of the first and second chemical tracer spools is configured to collect at least one sample of a fluid having at least one chemical tracer molecule therein.

In another aspect, the system comprises a third chemical tracer spool positioned at a third casing-casing annulus. The third chemical tracer spool comprises a housing including an inlet end and an outlet end. An inlet is coupled to the housing and positioned at the inlet end. An outlet is coupled to the housing and positioned at the outlet end. The third chemical tracer spool further comprise a porous layer comprising a polymer media and a chemical tracer molecule embedded therein. The porous layer is positioned within the housing between the inlet end and the outlet end. An inner surface of the porous layer defines a flow channel therethrough configured to allow fluid flow. The chemical tracer molecule has a chemical affinity for fluid selected from the group consisting of oil, gas, or water, and is configured to diffuse into the fluid flow. The chemical tracer molecule of the third chemical tracer spool is different than the chemical tracer molecule of the first chemical tracer spool and the second chemical tracer spool.

In another aspect, one or more of the chemical tracer molecules is released from the polymer media upon contact with the fluid for which the one or more chemical tracer molecules has a chemical affinity.

In another aspect, the system comprises a measurement apparatus configured to provide analysis of fluid flow from one or more of the first casing-casing annulus and the second casing-casing annulus.

In another aspect, the measurement apparatus includes a sensing device selected from the group consisting of a flow meter, a compositional analyzer, an optical probe, and combinations thereof.

In another aspect, the housing includes material selected from the group consisting of carbon steel, stainless steel, aluminum, polyvinyl chloride, polyethylene, nickel, chromium, and combinations thereof.

In another aspect, each chemical tracer spool comprises at least one longitudinal channel formed to receive chemical tracer molecules.

In another aspect, the housing comprises an interior pipe and an outer mesh surrounding the interior pipe.

In another aspect, the polymer media is selected from the group consisting of benzoxazine, polyepoxide, and combinations thereof.

In another aspect, the chemical tracer molecule is selected from the group consisting of fluorinated benzoic acids, perfluorinated hydrocarbons, sulfur hexafluoride, and combinations thereof.

In another aspect, the first and second chemical tracer spools are connected to one or more casings in the wellbore.

In another aspect, the flow channel is configured to allow fluid flow from the inlet to the outlet while allowing the fluid to contact chemical tracer molecules.

In another aspect, production tubing and a liner are disposed within the wellbore, and the first chemical tracer spool and the second chemical tracer spool are positioned between the production tubing and the liner.

In one aspect, embodiments disclosed herein relate to a method for identifying a leak in a casing-casing annulus of a well. The method comprises providing the system above, analyzing at least one sample of fluid to provide an analysis, and localizing a source of a leak in the wellbore based on the analysis.

In another aspect, analyzing the at least one sample of fluid comprises detecting at least one of the first chemical tracer molecule and the second chemical tracer molecule in the at least one sample fluid thereby producing a signal associated with at least one of the first chemical tracer molecule and the second chemical tracer molecule.

In another aspect, analyzing the at least one sample of fluid comprises quantifying a flow rate of the fluid.

In another aspect, the detecting occurs with a sensing device in a measurement apparatus, the sensing device selected from the group consisting of a flow meter, a compositional analyzer, an optical probe, and combinations thereof.

In another aspect, an action is initiated to address the leak.

In another aspect, the action is a casing repair.

In another aspect, one or more of the chemical tracer molecules is released from the porous media upon contact with the fluid for which the one or more chemical tracer molecules has a chemical affinity.

Other aspects and advantages of the claimed subject matter will be apparent from the following description and the appended claims.

DETAILED DESCRIPTION

Figure 1:
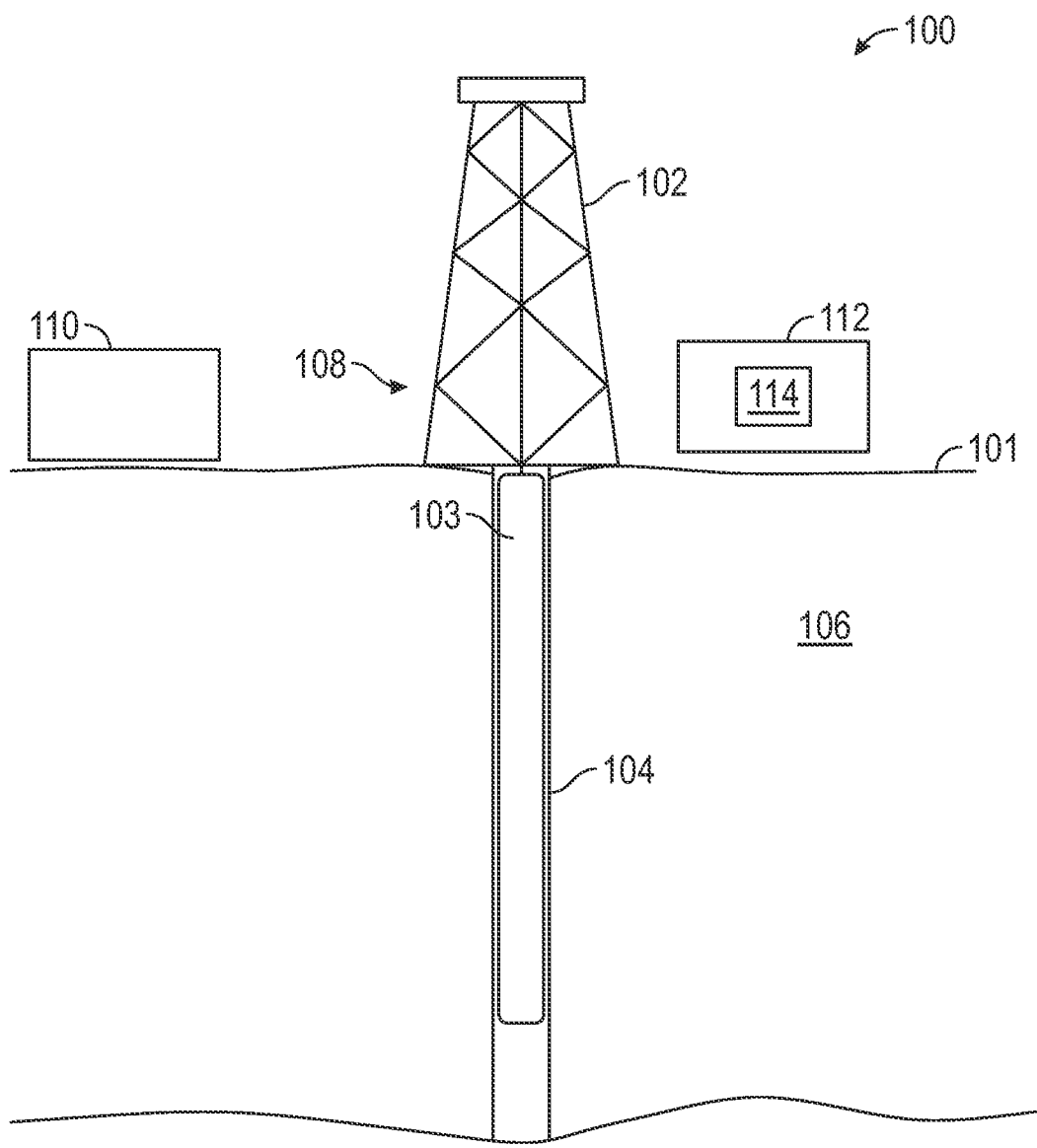
FIG. 1 illustrates a well environment according to one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a passive soil gas sample system" includes reference to one or more of such systems.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one aspect, embodiments disclosed herein relate to systems and processes for detecting a source of a fluid leak in a well. Embodiments disclosed herein relate generally to detecting a source of a fluid leak into casing-casing annulus (CCA) of a well. Even more specifically, embodiments herein relate to detecting a source of a fluid leak into a CCA of a well using a chemical tracer system.

Chemical tracer systems according to embodiments herein are a system that may be used to deliver chemical tracer molecules to produced fluids. For example, a chemical tracer system may be placed in a production flowline between production tubing and a casing or line. Chemical tracer systems according to embodiments herein may include a chemical tracer spool for delivering a chemical tracer molecule to the produced fluids. A chemical tracer spool includes a porous layer inside of a housing, with a chemical tracer molecule embedded in the porous layer. The chemical tracer molecule is a chemical that has a chemical affinity for a specific type of fluid, such as oil, water, or gas. When a produced fluid passes through the chemical tracer spool, the chemical tracer molecule may be released from the porous layer and carried downstream with the produced fluids. Once delivered to the produced fluids, the chemical tracer molecules may allow for identification and localization of flow of produced fluids in a well, even when the produced fluids are mixed with other produced fluids. If detected in an area that should not have fluid flow, such as a casing-casing annulus, a leak in the wellbore may be localized.

In one or more embodiments, the system may run from a well environment. FIG. 1 illustrates an exemplary well environment (100) that may include a wellhead (102) having a wellbore (104) extending into a formation (106). The wellbore (104) may include a bored hole that extends from the surface (101) into a target zone of the formation (106), such as a reservoir. One or more casings (103) may be installed in the wellbore (104). In one or more embodiments, the one or more casings (103) may be perforated to have perforations into the target formation (106) to allow a flow of reservoir fluid to enter the wellbore (104). The well environment (100) may include a drilling system (108), a logging system (110), and a control system (112). The drilling system (108) may include a drill string, drill bit, a mud circulation system and/or the like for use in boring the wellbore (104) into the formation (106). The control system (112) may include a computer (114).

During the life of a well, the well may exhibit positive casing-casing annulus pressure due to absence of a barrier or a barrier failure. The principle concern for wells that exhibit continuous/sustained annulus pressure is that a downhole situation is developing or has developed that can result in an underground blowout. In such a scenario, immediate action is needed to bring the pressure below operating limits, with a rigless solution or with the use of a rig. It is challenging to identify a leak source so that appropriate action can be taken. Current leak detection techniques may be costly and time-consuming. The system and method described herein provides a cost-effective solution to the current practices. Additionally, since well intervention is not needed to identify a downhole leak, environmental impact is reduced. Chemical tracer analysis of effluent samples collected from a potentially problematic casing-casing annulus provides information related to the leak source so that appropriate action can be initiated by an operator to address the problem. Each of these aspects will be described in further detail below.

Figure 2:
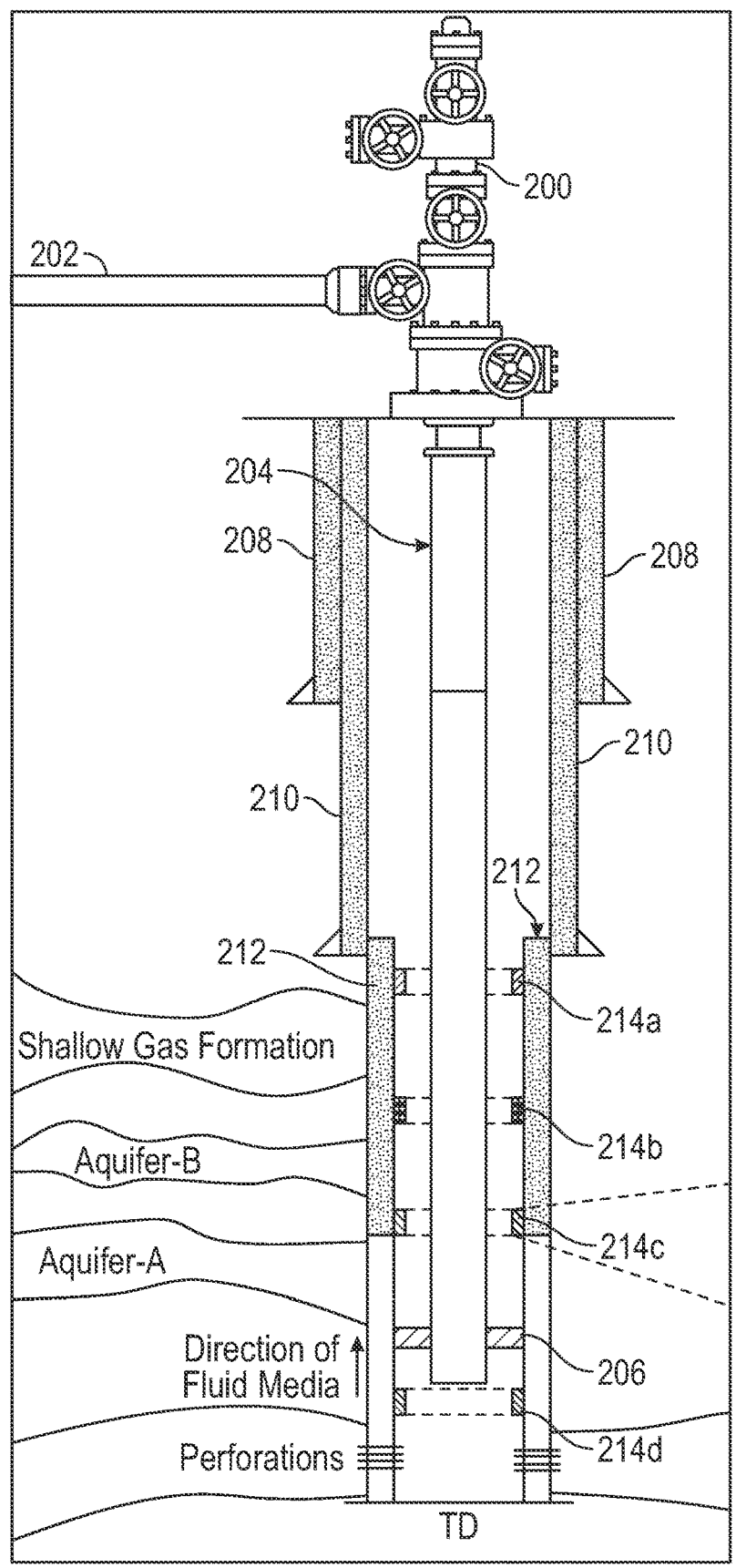
FIG. 2 illustrates a cross-section of a well with chemical tracer spools according to one or more embodiments of the present disclosure.

FIG. 2 is a cross-sectional illustration of a well with a plurality of chemical tracer spools according to one or more embodiments of the present disclosure. As shown, the well includes a wellhead (200) in connection with a production line (202) to oil crude processing facilities, production tubing (204), and one or more packers (206). The production tubing (204) is encased by a surface casing (208), an intermediate casing (210), and a liner (212). A plurality of chemical tracer spools (214a, 214b, 214c, and 214d) may be installed on a casing (208, 210), a liner (212), or both, during well construction. Each chemical tracer spool may be connected to a casing (208, 210), or liner (212), through any suitable attachment mechanism, such as threaded couplings. The number of chemical tracer spools (214a, 214b, 214c, and 214d) installed on a well depends on the number of known aquifers, shallow gas, and producing formations.

In one or more embodiments, the characteristics of a formation are established before installing the plurality of chemical tracer spools (214a, 214b, 214c, and 214d). For instance, downhole samples may be obtained from each layer of a formation, such as a shallow aquifer, and analyzed during prior drilling activities. The data obtained from the analysis may then be stored as reference data and used to determine where to install chemical tracer spools as well as how many chemical tracer spools to install. During analysis, data related to a sample having a chemical tracer (or tracers) may be compared to the set of reference data to identify the location (e.g., layer) of the leak source in the formation.

Figure 3:
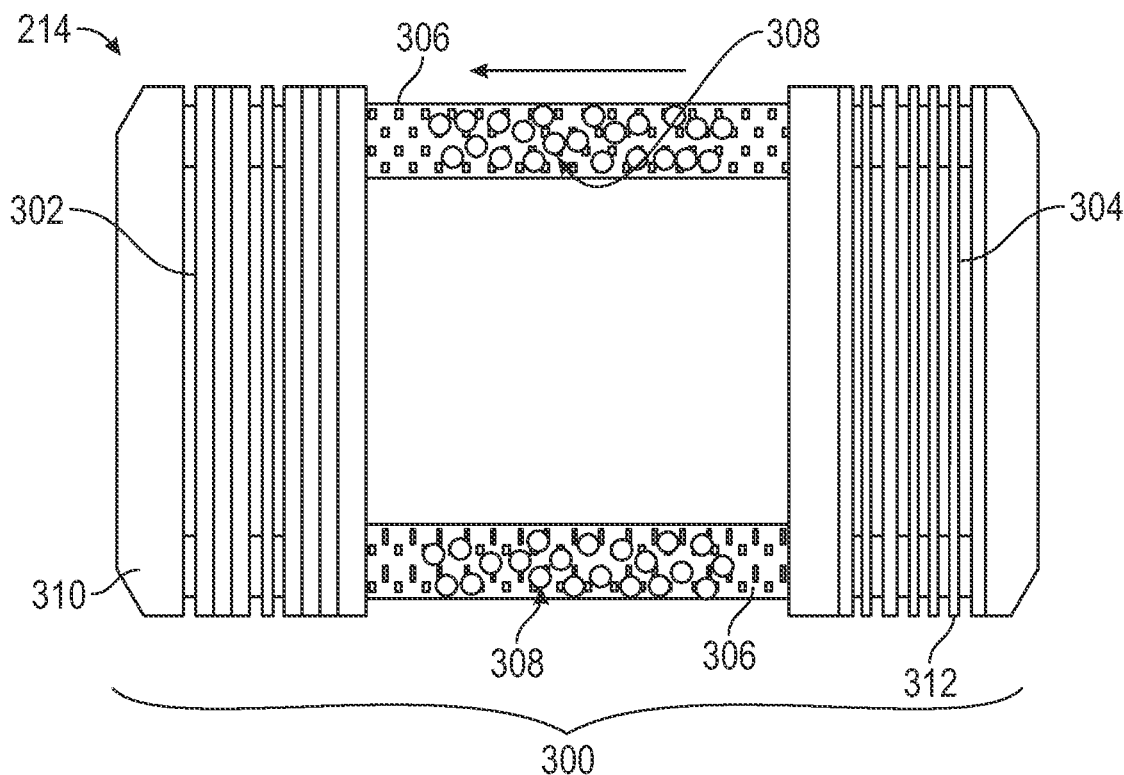
FIG. 3 illustrates a front view of a chemical tracer spool according to one or more embodiments of the present disclosure.

FIG. 3 depicts a front view of a chemical tracer spool according to one or more embodiments of the present disclosure. The chemical tracer spool (214) includes a housing (300) having an inlet end and an outlet end. An inlet (302) is coupled to the housing (300) and positioned at the inlet end of the chemical tracer spool (214). An outlet (304) is coupled to the housing (300) and positioned at the outlet end of the chemical tracer spool (214). The chemical tracer spool (214) houses a chemical tracer molecule that may be released into fluid that flows through the system. A chemical tracer molecule has chemical affinity for a particular type of fluid and is released from its fixed position in a chemical tracer spool when the corresponding fluid type flows through the spool. Thus, the chemical tracer molecule, spool, and system allows for identification of fluids that flow from a well. The chemical tracer spool may have a cylindrical shape (circular cross-section), but is not limited to a cylindrical shape, and other embodiments may be square, rectangular, prismatic, or another suitable shape as may be used for flow conduits.

In one or more embodiments, the chemical tracer spool (214) has a porous layer (306) comprising a polymer media. The polymer media may include, but is not limited to benzoxazine, polyepoxides (epoxy resins), and combinations thereof. The porous layer (306) may include carbon steel and/or stainless steel. As a non-limiting example, perforated channels may be positioned between the inner surface of the housing (300) and the porous layer (306), connected to the porous layer (306), or within the porous layer (306). These perforated channels may be made of steel or another suitable material. The perforated channels may be positioned longitudinally in the housing (300) (from inlet (302) to outlet (304)) such that materials that flow through the perforated channels are evenly distributed through the porous layer (306).

In one or more embodiments, a chemical tracer molecule (308) is embedded in the porous layer (306). A chemical tracer molecule (308) is a uniquely identifiable molecule, for example, when compared to a different chemical tracer molecule or another compound as may be expected to be transported through the chemical tracer spool (214). The chemical tracer molecule (308) also has a specific affinity to oil, water, or gas. Suitable examples of a chemical tracer molecule include, but are not limited to fluorinated benzoic acid, perfluorinated hydrocarbons, sulfur hexafluoride ($SF_6$), and combinations thereof. Embedding the chemical tracer molecule (308) in the porous layer (306) may occur by pumping the chemical tracer molecule (308) through the perforated channels to evenly distribute the chemical tracer molecules (308) therein. The chemical tracer molecules (308) remain in the porous layer (306) until they encounter a compatible fluid (e.g., oil, water, gas) for which the chemical tracer molecule has an affinity, after which they are released.

The porous layer (306) is positioned within the housing (300) of a chemical tracer spool (214) between the inlet (302) and the outlet (304) and is configured to allow fluid flow. The porous layer (306) is positioned along the inner surface of the housing (300). The porous layer (306) advantageously withstands temperature, flow rate, and pressure regularly observed in a flowline while remaining intact. Materials that make up the housing include, but are not limited to carbon steel, stainless steel, aluminum, polyvinyl chloride, polyethylene, nickel, chromium, combinations thereof, and other various materials that may be used for flow conduits. In one or more embodiments, the housing (300) comprises an interior pipe (310) and an outer mesh (312) surrounding the interior pipe (310), such as a wire screen. The housing (300) may be attached to a casing or liner in the well. The chemical tracer molecules (308) may be embedded between the pipe (310) and the mesh (312) by pumping the chemical tracer molecules (308) through one or more flow channels in the pipe (310) and/or outer mesh (312). The chemical tracer molecules (308) are evenly distributed around the full circumference of the pipe (310) to provide complete radial exposure to the leak fluids. When there is flow within any casing-casing annulus, the chemical tracers will travel in the direction of the fluid (indicated by the arrow) to the surface.

Figure 4:
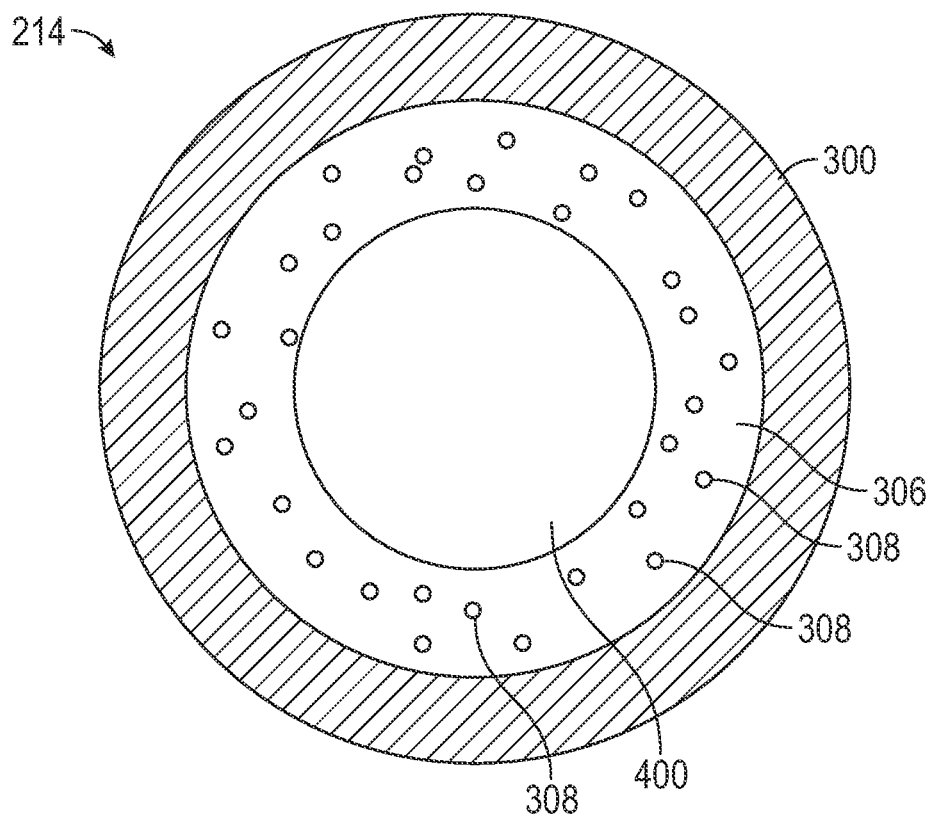
FIG. 4 illustrates a side, sectional view of a chemical tracer spool according to one or more embodiments of the present disclosure.

FIG. 4 depicts a side, sectional view of a chemical tracer spool (214). In one or more embodiments, the chemical tracer spool (214) includes a flow channel (400) positioned along the central longitudinal axis of the housing (300) defining an inner surface of the porous layer (306). The flow channel (400) is configured to allow fluid flow from the inlet to the outlet while allowing the fluid to interact with and extract the chemical tracer molecules (308) from the porous layer (306).

In general, there may be a plurality of chemical tracer spools in the system, with the plurality of chemical tracer spools present at different casing-casing annuli. Each respective chemical tracer spool may have a unique chemical tracer molecule such that the presence of that unique marker may identify and localize the presence of a leak into a particular casing-casing annulus. For example, in the embodiment shown in FIG. 2, a first chemical tracer spool (214a) having an affinity for water, a second chemical tracer spool (214b) having an affinity for oil, and a third chemical tracer spool (214c) having an affinity for gas, may be positioned between the production tubing (204) and the liner (212) disposed within the wellbore at various distances along a length of the production tubing (204). In this manner, any oil, water, and gas that flows from the production tubing into a casing-casing annulus due to a leak may be quantified. For instance, with knowledge of the initial quantity, or concentration, of chemical tracer in each chemical tracer spool, the flow rate may be quantified based on the amount of chemical tracer present in the fluid being sampled at the surface and the known properties of the fluid.

In one or more embodiments, the particular types of oil, gas, and water being produced at the formation may be used in compatibility tests to ensure the fluids that pass through the chemical tracer spools are able to release the chemical tracer molecules so that they may be detected at the surface. Additionally, a minimum detection limit of a chemical tracer molecule may be determined to ensure the chemical tracer molecule is used in quantities high enough for detection. In one or more embodiments, a solution having a high concentration of the chemical tracer molecule (e.g., 106 ppm) is prepared to create a stock solution. Diluted sample solutions may be prepared and analyzed using fractions of the stock solution. Analysis may include adding a quantity of a reagent to each diluted sample solution and observing color variation, performing mass spectrometry analysis, and/or any other suitable type of analysis. From the analyses of the diluted sample solutions, an optimum range of chemical tracer molecules may be determined. The steps above may be repeated within the optimum range to get a minimum detectable concentration of the chemical tracer molecule.

One or more chemical tracer spools (214) may be localized between the production tubing (204) and the surface casing (208) and/or the production tubing (204) and the intermediate casing (210). As a chemical tracer spool releases the chemical tracer molecules, the chemical tracer spool becomes depleted of the chemical tracer molecule. In other words, the porous layer in the chemical tracer spool loses chemical tracer molecule during use. For example, the chemical tracer molecule may be released into fluid and passed from the chemical tracer spool. When the chemical tracer spool is depleted of the chemical tracer molecule, the chemical tracer spool may be replaced. In one or more embodiments, the chemical tracer spool is modular. Thus, a chemical tracer spool may be removed from the system. When the chemical tracer spool is removed from the system, this allows for repair, maintenance, refill of chemical tracer molecule, or replacement of the chemical tracer spool. In some embodiments, for example, the porous media may be a cartridge that may be easily inserted and withdrawn from the housing. In other embodiments, for example, the porous media may be coated or installed within the housing and, thus, the chemical tracer spool may be replaced with another module (housing, porous media, and chemical tracer molecule having similar connections and dimensions as the spool being replaced).

Other combinations of chemical tracer molecule types may be matched with different amounts and configurations of chemical tracer spools in a system according to one or more embodiments. Advantageously, the chemical tracer system is not particularly limited in configuration so that it may meet the requirements of a variety of wells and wellheads. As a non-limiting example, in a water producing well there may be a need to include multiple chemical tracer spools with a chemical tracer molecule having chemical affinity for water. When a fluid media (oil, water, or gas) comes into contact with a chemical tracer spool, the respective chemical tracer molecules diffuse into the flow stream and move to the surface through channels, or flow paths, in the well, where samples of the fluid media may be collected.

Figure 5:
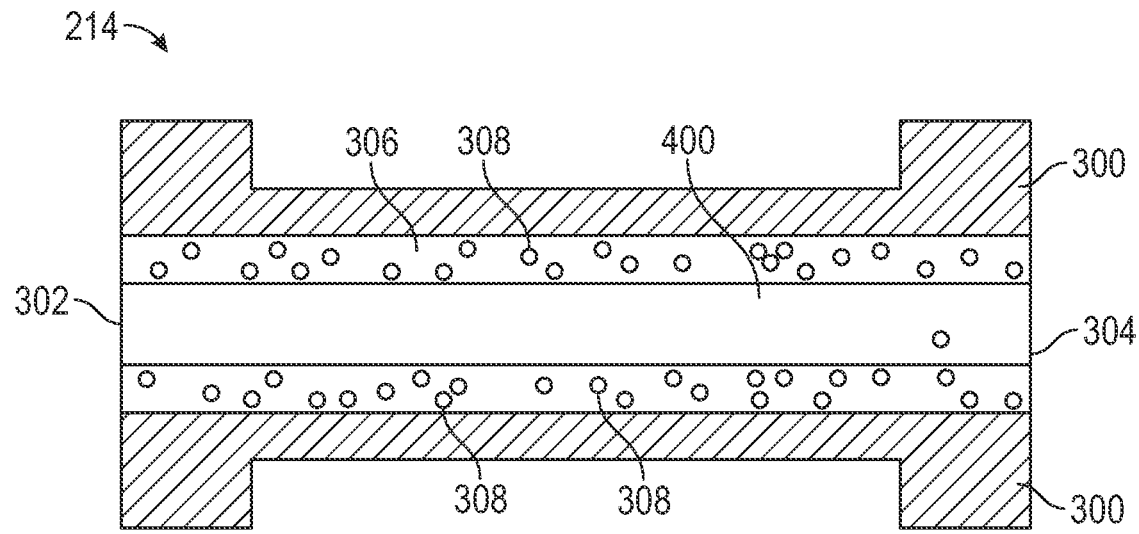
FIG. 5 illustrates a front, sectional view of a chemical tracer spool according to one or more embodiments of the present disclosure.

FIG. 5 depicts a chemical tracer spool (214), cross-sectioned along the central longitudinal axis of the housing. FIG. 5 shows the porous layer (306) positioned along the inner surface of the housing (300). As shown in FIG. 5, the porous layer (306) may extend from the inlet (302) at the inlet end of the housing (300) to the outlet (304) at the outlet end of the housing (300). The chemical tracer molecule (308) is embedded in the porous layer (306). The flow channel (400) is positioned along the central longitudinal axis of the housing (300) defining an inner surface of the porous layer (306). As shown in FIG. 5, the flow channel (400) may be a void (empty space) when installed and prior to fluid flow through the flow channel.

Figure 6:
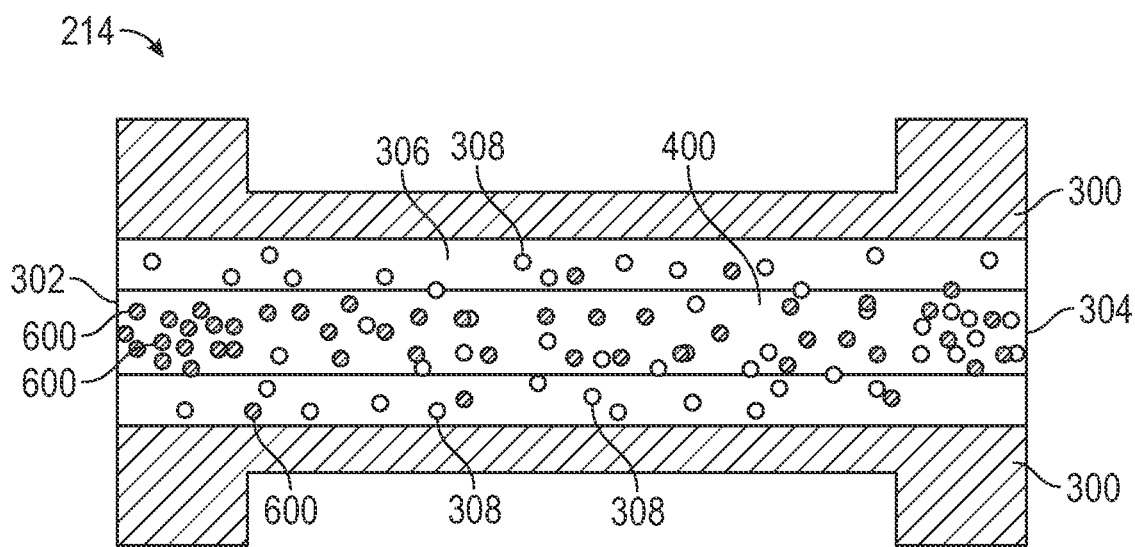
FIG. 6 illustrates a side, sectional view of a chemical tracer spool with fluid flow according to one or more embodiments of the present disclosure.

FIG. 6 depicts a sectional view of the chemical tracer spool (214) with fluid flow. The chemical tracer spool (214) is shown cross-sectioned along the central longitudinal axis of the housing (300). When a fluid (600) enters the housing (300) of the chemical tracer spool (214) at the inlet end, the fluid flows through the flow channel (400). The fluid (600) also flows through the porous layer (306). As fluid passes through the porous layer (306) from the inlet end to the outlet end of the housing (300), it intermingles with the chemical tracer molecules (308) that are embedded in the porous layer (306). Chemical tracer molecules (308) that have chemical affinity for the respective fluid may break free from the porous layer (306) and enter the fluid (600). Fluid that contains the chemical tracer molecules passes from the outlet end of the housing (300) and exits the chemical tracer spool (214), being carried downstream with the fluid flow.

When combined with other advantages of the chemical tracer molecule, including having specific chemical affinity for oil, water, or gas, and being uniquely identifiable, further advantages of the system may be present when more than one type of chemical tracer molecule is included. As previously described, in one or more embodiments there may be one type of chemical tracer molecule embedded in the porous layer. In one or more embodiments, there may be more than one type of chemical tracer molecule embedded in the porous layer of the chemical tracer spool. When a chemical tracer molecule that has specific chemical affinity for oil and a chemical tracer molecule that has specific affinity for gas are included, the different types of chemical tracer molecule may break free from the porous layer at different rates according to the fluid composition. In other words, the rate at which the different types of chemical tracer molecule break free from the porous layer is dependent upon the type of fluid that flows through the chemical tracer spool (and other parameters related to chemical affinity as previously described). The chemical affinity of a specific type of chemical tracer molecule may also extend to water and other fluids commonly present in a flowline. Thus, a chemical tracer spool may be tailored with different types of the chemical tracer molecule for identifying and quantifying a combination of different types of fluid, and for identifying and localizing leaks from a well.

A chemical tracer molecule that has specific chemical affinity for oil includes, but is not limited to, a perfluorinated hydrocarbon. For example, perfluorinated hydrocarbons useful in embodiments herein may not have chemical affinity for gas or water. Non-limiting examples of perfluorinated hydrocarbons that may be used include perfluorodimethylcyclobutane, perfluoromethylcyclopentane, and perfluoromethylcyclohexane, among others. Each of the CCAs associated with the system may, thus, be provided a unique chemical tracer molecule having an affinity for oil, if desired, for example.

A chemical tracer molecule that has specific chemical affinity for gas includes, but is not limited to, sulfur hexafluoride ($SF_6$). For example, sulfur hexafluoride ($SF_6$) may not have chemical affinity for oil or water. Other volatile molecules having an affinity for gas may also be used to thus provide a unique chemical tracer molecule having affinity for gas, if desired, for example.

A chemical tracer molecule that has specific chemical affinity for water includes, but is not limited to, fluorinated benzoic acids. For example, fluorinated benzoic acids may not have chemical affinity for gas or oil. Various fluorinated benzoic acids or other fluorinated acids may be used to provide each casing-casing annulus associated with the system a unique prospector molecule having affinity for water, if desired, for example.

In one or more embodiments, the system includes one or more collection points for withdrawing a sample of a fluid comprising chemical tracer molecules and fluids that may have diffused through a leak in one or more casing-casing annuli. The collected fluid may be used for analyses, such as identifying and quantifying the flow from each casing-casing annulus. The collection point is configured to withdraw a sample of the fluid if present. The withdrawn fluid may be collected by hand or may be routed automatically to a measurement apparatus. One or more collection points (or sample points) for this purpose may be included downstream of each chemical tracer spool, such as at the surface of the formation. Multiple collection points may be included in the system to analyze fluid flow at various locations. An effluent sample may collected from an identified problematic casing-casing annulus. The casing-casing annulus sample may be analyzed in a laboratory for the presence of chemical tracer to identify the source of the leak into the identified annulus. For instance, the sample may be analyzed using gas chromatography and/or mass spectrometry methods. The presence of chemical tracer may be detected by any suitable method or technology known to those skilled in the art.

In one or more embodiments, the system includes a measurement apparatus downstream of the chemical tracer spool. The measurement apparatus may be downstream of a collection point, such that a fluid sample may pass from the collection point to the measurement apparatus. The measurement apparatus includes a sensing device. The sensing device may be, for example, a flow meter, a compositional analyzer, an optical probe, a pressure transmitter, a temperature transmitter, and combinations thereof. The sensing device detects a specific chemical tracer molecule (or a property of the specific chemical tracer molecule) in the fluid. The sensing device may detect multiple types of chemical tracer molecules in a fluid, such as in a commingled fluid. Quantitative and qualitative properties that may be measured by the measurement apparatus include flow rate (gross flow rate), concentration of chemical tracer molecule, water cut percentage, gas oil ratio (GOR), fluid velocity, and combinations thereof. The measurement apparatus may include a computer control device configured for receiving output of the measurement apparatus and for breaking out individual fluid properties (flow rate, etc.) and characteristics (e.g., oil, gas, water) of the individual fluids in a commingled fluid flow. The computer control device may be useful for analyzing the quantitative properties (e.g., flow rate of the fluid flow) and qualitative properties (i.e., identification of chemical tracer type) of the fluid from the well. Mathematical modeling, artificial intelligence, and machine learning techniques may be utilized to analyze the obtained data.

In one or more embodiments, a first chemical tracer spool positioned at a first casing-casing annulus includes a first chemical tracer molecule having an affinity for a first fluid, such as oil. A second chemical tracer spool positioned at a second casing-casing annulus includes a second chemical tracer molecule, different from the first chemical tracer molecule, having an affinity for a second fluid, such as gas. Additionally, the system may include a third chemical tracer spool and a third chemical tracer molecule having an affinity for a third fluid, such as water. As appreciated by one skilled in the art, the system may comprise any number of chemical tracer spools and associated chemical tracer molecules required for a particular well.

Figure 7:
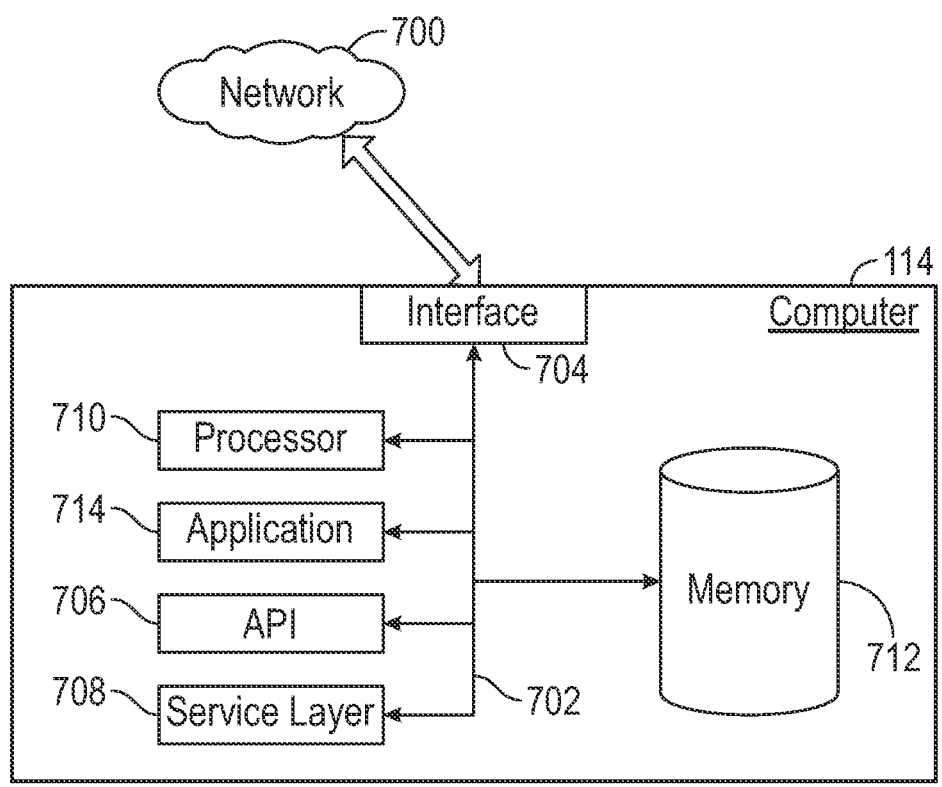
FIG. 7 illustrates a computing system according to one or more embodiments of the present disclosure.

FIG. 7 further depicts a block diagram of a computer (114) used to provide computational functionalities associated with described algorithms, methods, functions, processes, flows, and procedures as described in this disclosure, according to one or more embodiments. The illustrated computer (114) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may include an input device, such as a keypad, keyboard, touch screen, or other device that can accept user information, and an output device that conveys information associated with the operation of the computer (114), including digital data, visual, or audio information (or a combination of information), or a GUI.

The computer (114) can serve in a role as a client, network component, a server, a database or other persistency, or any other component (or a combination of roles) of a computer system for performing the subject matter described in the instant disclosure. The illustrated computer (114) is communicably coupled with a network (700). In some implementations, one or more components of the computer (114) may be configured to operate within environments, including cloud-computing-based, local, global, or other environment (or a combination of environments).

At a high level, the computer (114) is an electronic computing device operable to receive, transmit, process, store, or manage data and information associated with the described subject matter. According to some implementations, the computer (114) may also include or be communicably coupled with an application server, e-mail server, web server, caching server, streaming data server, business intelligence (BI) server, or other server (or a combination of servers).

The computer (114) can receive requests over network (700) from a client application (for example, executing on another computer (114)) and responding to the received requests by processing the said requests in an appropriate software application. In addition, requests may also be sent to the computer (114) from internal users (for example, from a command console or by other appropriate access method), external or third-parties, other automated applications, as well as any other appropriate entities, individuals, systems, or computers.

Each of the components of the computer (114) can communicate using a system bus (702). In some implementations, any or all of the components of the computer (114), both hardware or software (or a combination of hardware and software), may interface with each other or the interface (704) (or a combination of both) over the system bus (702) using an application programming interface (API) (706) or a service layer (708) (or a combination of the API (706) and service layer (708)). The API (706) may include specifications for routines, data structures, and object classes. The API (706) may be either computer-language independent or dependent and refer to a complete interface, a single function, or even a set of APIs. The service layer (708) provides software services to the computer (114) or other components (whether or not illustrated) that are communicably coupled to the computer (114). The functionality of the computer (114) may be accessible for all service consumers using this service layer. Software services, such as those provided by the service layer (708), provide reusable, defined business functionalities through a defined interface. For example, the interface may be software written in JAVA, C++, or other suitable language providing data in extensible markup language (XML) format or another suitable format. While illustrated as an integrated component of the computer (114), alternative implementations may illustrate the API (706) or the service layer (708) as stand-alone components in relation to other components of the computer (114) or other components (whether or not illustrated) that are communicably coupled to the computer (114). Moreover, any or all parts of the API (706) or the service layer (708) may be implemented as child or sub-modules of another software module, enterprise application, or hardware module without departing from the scope of this disclosure.

The computer (114) includes an interface (704). Although illustrated as a single interface (704) in FIG. 7, two or more interfaces (704) may be used according to particular needs, desires, or particular implementations of the computer (114). The interface (704) is used by the computer (114) for communicating with other systems in a distributed environment that are connected to the network (700). Generally, the interface (704) includes logic encoded in software or hardware (or a combination of software and hardware) and operable to communicate with the network (700). More specifically, the interface (704) may include software supporting one or more communication protocols associated with communications such that the network (700) or interface's hardware is operable to communicate physical signals within and outside of the illustrated computer (114).

The computer (114) includes at least one computer processor (710). Although illustrated as a single computer processor (710) in FIG. 7, two or more processors may be used according to particular needs, desires, or particular implementations of the computer (114). Generally, the computer processor (710) executes instructions and manipulates data to perform the operations of the computer (114) and any algorithms, methods, functions, processes, flows, and procedures as described in the instant disclosure.

The computer (114) also includes a memory (712) that holds data for the computer (114) or other components (or a combination of both) that can be connected to the network (700). For example, memory (712) can be a database storing data consistent with this disclosure. Although illustrated as a single memory (712) in FIG. 7, two or more memories may be used according to particular needs, desires, or particular implementations of the computer (114) and the described functionality. While memory (712) is illustrated as an integral component of the computer (114), in alternative implementations, memory (712) can be external to the computer (114).

The application (714) is an algorithmic software engine providing functionality according to particular needs, desires, or particular implementations of the computer (114), particularly with respect to functionality described in this disclosure. For example, application (714) can serve as one or more components, modules, applications, etc. Further, although illustrated as a single application (714), the application (714) may be implemented as multiple applications (714) on the computer (114). In addition, although illustrated as integral to the computer (114), in alternative implementations, the application (714) can be external to the computer (114).

There may be any number of computers (114) associated with, or external to, a computer system containing computer (114), wherein each computer (114) communicates over network (700). Further, the term "client," "user," and other appropriate terminology may be used interchangeably as appropriate without departing from the scope of this disclosure. Moreover, this disclosure contemplates that many users may use one computer (114), or that one user may use multiple computers (114).

Figure 8:
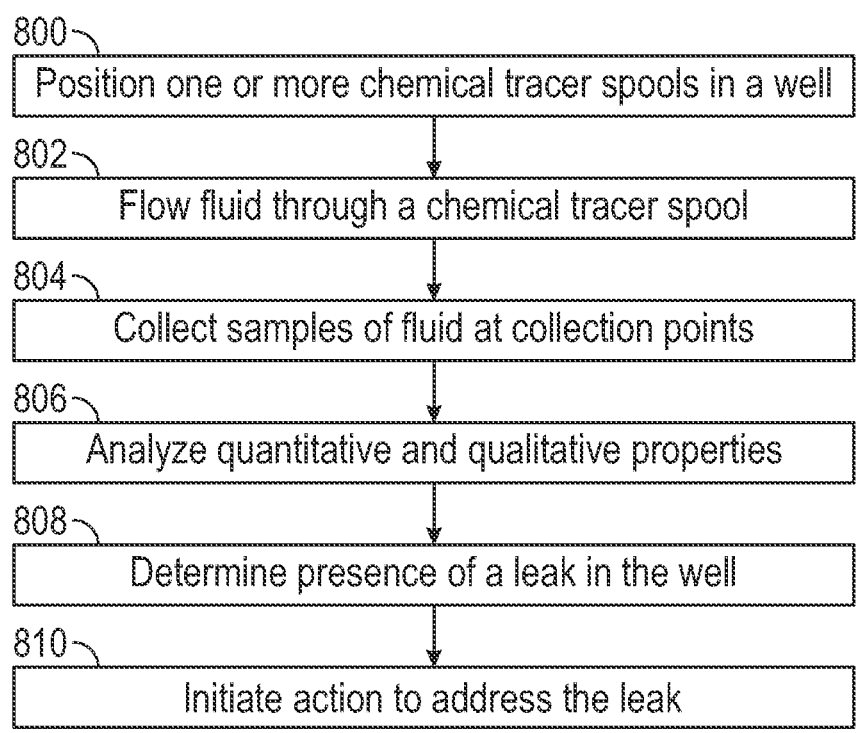
FIG. 8 illustrates a method for identifying a leak in a casing-casing annulus of a well according to one or more embodiments of the present disclosure.

FIG. 8 shows a flowchart in accordance with one or more embodiments. Specifically, FIG. 8 illustrates a method for identifying a leak in a casing-casing annulus of a well. While the various blocks in FIG. 8 are presented and described sequentially, one of ordinary skill in the art will appreciate that some or all of the blocks may be executed in a different order, may be combined or omitted, and some or all of the blocks may be executed in parallel. Furthermore, the block may be performed actively or passively.

A method for identifying and quantifying a fluid in a well comprises providing a system according to one or more embodiments. The method may include producing a fluid from a well. When the fluid passes through a wellhead, the method may include producing the fluid from the wellhead. In one or more embodiments, the method includes positioning one or more chemical tracer spools at desired casing-casing annuli in a well in block (800). Further, the method includes flowing fluid through at least one chemical tracer spool in block (802). When the fluid intermingles with the chemical tracer molecule, the respective chemical tracer molecule breaks free from the porous layer in the chemical tracer spool and diffuses into the fluid. The fluid passes from the chemical tracer spool and flows into the well.

In one or more embodiments, the method includes collecting one or more samples of fluid at one or more collection points in block (804). In block (806), the quantitative and qualitative properties of the one or more samples may be analyzed. A fluid sample that is collected at the collection point may be analyzed for presence of a chemical tracer molecule to characterize flows based on measurements from the measurement apparatus and computer control device. Measurements may include quantitative and qualitative analysis using the computer (114) described above. In this manner, the method may include determining whether a leak is present in a casing-casing annulus in block (808) and determining the extent of the leak. Based on the qualitative analysis, a leak may be identified as being oil, water, gas, or a combination thereof. Further, it may be determined that a leak does not exist in a well in the absence of detected chemical tracer molecules for a particular fluid. If a leak is detected, the method may further include planning remedial actions regarding a well with one or more leaks based on measurement results or trends in the measurement results in block (810). For instance, once a leak is detected along with the interval, or area, of a particular chemical tracer spool, a mechanical workover of the well, such as a casing repair, may be planned to salvage the well integrity without the need for additional rigless operations, such as a log, and to identify the feeding sources while eliminating reoccurrences.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A system for identifying a leak in a casing-casing annulus of a well, comprising:
   a wellbore;
   a first chemical tracer spool positioned at a first casing-casing annulus of the wellbore and a second chemical tracer spool positioned at a second casing-casing annulus of the wellbore, the first chemical tracer spool and the second chemical tracer spool each comprising:
   a housing including an inlet end and an outlet end;
   an inlet coupled to the housing and positioned at the inlet end;
   an outlet coupled to the housing and positioned at the outlet end; and
   a porous layer comprising a polymer media and a chemical tracer molecule embedded therein, the porous layer being positioned within the housing between the inlet end and the outlet end, an inner surface of the porous layer defining a flow channel therethrough configured to allow fluid flow;
   wherein the chemical tracer molecule has a chemical affinity for fluid selected from the group consisting of oil, gas, or water, and is configured to diffuse into the fluid flow; and
   wherein the chemical tracer molecule of the first chemical tracer spool is different than the chemical tracer molecule of the second chemical tracer spool; and
   at least one collection point downstream of the first and second chemical tracer spools configured to collect at least one sample of a fluid.

2. The system of claim 1, further comprising a third chemical tracer spool positioned at a third casing-casing annulus, the third chemical tracer spool comprising:
   a housing including an inlet end and an outlet end;
   an inlet coupled to the housing and positioned at the inlet end;
   an outlet coupled to the housing and positioned at the outlet end;
   a porous layer comprising a polymer media and a chemical tracer molecule embedded therein, the porous layer being positioned within the housing between the inlet end and the outlet end, an inner surface of the porous layer defining a flow channel therethrough configured to allow fluid flow;
   wherein the chemical tracer molecule has a chemical affinity for fluid selected from the group consisting of oil, gas, or water, and is configured to diffuse into the fluid flow; and
   wherein the chemical tracer molecule of the third chemical tracer spool is different than the chemical tracer molecule of the first chemical tracer spool and the second chemical tracer spool.

3. The system of claim 1, wherein one or more of the chemical tracer molecules is released from the polymer media upon contact with the fluid for which the one or more chemical tracer molecules has a chemical affinity.

4. The system of claim 1, further comprising a measurement apparatus configured to provide analysis of fluid flow from one or more of the first casing-casing annulus and the second casing-casing annulus.

5. The system of claim 4, wherein the measurement apparatus includes a sensing device selected from the group consisting of a flow meter, a compositional analyzer, an optical probe, and combinations thereof.

6. The system of claim 1, wherein the housing includes material selected from the group consisting of carbon steel, stainless steel, aluminum, polyvinyl chloride, polyethylene, nickel, chromium, and combinations thereof.

7. The system of claim 1, wherein each chemical tracer spool comprises at least one longitudinal channel formed to receive chemical tracer molecules.

8. The system of claim 1, wherein the housing comprises an interior pipe and an outer mesh surrounding the interior pipe.

9. The system of claim 1, wherein the polymer media is selected from the group consisting of benzoxazine, polyepoxide, and combinations thereof.

10. The system of claim 1, wherein the chemical tracer molecule is selected from the group consisting of fluorinated benzoic acids, perfluorinated hydrocarbons, sulfur hexafluoride, and combinations thereof.

11. The system of claim 1, wherein the first and second chemical tracer spools are connected to one or more casings in the wellbore.

12. The system of claim 1, wherein the flow channel is configured to allow fluid flow from the inlet to the outlet while allowing the fluid to contact chemical tracer molecules.

13. The system of claim 1, wherein production tubing and a liner are disposed within the wellbore, and wherein the first chemical tracer spool and the second chemical tracer spool are positioned between the production tubing and the liner.

14. A method for identifying a leak in a casing-casing annulus of a well, comprising:
provining a system, comprising:
a wellbore;
a first chemical tracer spool positioned at a first casing-casing annulus of the wellbore and a second chemical tracer spool positioned at a second casing-casing annulus of the wellbore, the first chemical tracer spool and the second chemical tracer spool each comprising:
a housing including an inlet end and an outlet end;
an inlet coupled to the housing and positioned at the inlet end;
an outlet coupled to the housing and positioned at the outlet end;
a porous layer comprising a polymer media and a chemical tracer molecule embedded therein, the porous layer being positioned within the housing between the inlet end and the outlet end, an inner surface of the porous layer defining a flow channel therethrough configured to allow fluid flow of a fluid;
wherein the chemical tracer molecule has a chemical affinity for fluid selected from the group consisting of oil, gas, or water, and is configured to diffuse into the fluid flow; and
wherein the chemical tracer molecule of the first chemical tracer spool is different than the chemical tracer molecule of the second chemical tracer spool; and
at least one collection point configured to collect at least one sample of the fluid having at least one chemical tracer molecule therein;
analyzing the at least one sample of fluid to provide an analysis of the at least one sample of fluid; and
localizing a source of a leak in the wellbore based on the analysis.

15. The method of claim 14, wherein the analyzing the at least one sample of fluid comprises:
detecting at least one of the first chemical tracer molecule and the second chemical tracer molecule in the at least one sample fluid thereby producing a signal associated with at least one of the first chemical tracer molecule and the second chemical tracer molecule.

16. The method of claim 15, wherein the detecting occurs with a sensing device in a measurement apparatus, the sensing device selected from the group consisting of a flow meter, a compositional analyzer, an optical probe, and combinations thereof.

17. The method of claim 14, wherein the analyzing the at least one sample of fluid comprises quantifying a flow rate of the fluid.

18. The method of claim 14, further comprising initiating an action to address the leak.

19. The method of claim 18, wherein the action is a casing repair.

20. The method of claim 14, further comprising releasing one or more of the chemical tracer molecules from the porous media upon contact with the fluid for which the one or more chemical tracer molecules has a chemical affinity.

* * * * *